United States Patent [19]

Vander Meulen

[11] 4,113,328
[45] Sep. 12, 1978

[54] WHEEL BEARING ASSEMBLY WITH PLASTIC BEARING SEALS

[75] Inventor: Douglas J. Vander Meulen, Shelbyville, Mich.

[73] Assignee: C. L. Frost & Son, Inc., Grand Rapids, Mich.

[21] Appl. No.: 826,758

[22] Filed: Aug. 22, 1977

[51] Int. Cl.² .............................................. F16C 33/72
[52] U.S. Cl. .................... 308/187.1; 308/190
[58] Field of Search ............... 308/190, 245, 191–192, 308/187.1, 195, 189, 196, DIG. 8, 18, 20, 208, DIG. 7, 36.1–36.5, 237 R; 16/107; 301/5 R, 5.3, 5.7; 74/569; 193/37; 198/845; 29/110, 116 R; 295/36

[56] References Cited

U.S. PATENT DOCUMENTS

| | | | |
|---|---|---|---|
| 2,076,239 | 4/1937 | Lemmon | 308/190 |
| 3,807,817 | 4/1974 | Black | 308/190 |
| 4,019,789 | 4/1977 | Rosin et al. | 308/190 |

*Primary Examiner*—Trygve M. Blix
*Assistant Examiner*—Douglas C. Butler
*Attorney, Agent, or Firm*—Price, Heneveld, Huizenga & Cooper

[57] ABSTRACT

A sealed wheel bearing assembly including thermoplastic seals permanently fused to a thermoplastic wheel or bearing. The thermoplastic wheel or outer bearing member has at least one row of bearings fitted between an outer raceway in a central aperture extending through the wheel or bearing member and an inner raceway on an inner race. An annular seal on one side, formed from a thermoplastic material, centers itself on and engages an annular surface of the inner race. A sealing disc, also formed from a thermoplastic material, may be included on the opposite side to cover the end of the inner race and the entire central wheel or bearing aperture. Both the seal and sealing disc are fused, preferably by ultrasonic welding, to the thermoplastic wheel or bearing member. The assembly is especially useful in trolley conveyor, conveyor and other bearing applications to prevent bearing contamination by moisture, dirt or the like.

24 Claims, 11 Drawing Figures

WHEEL BEARING ASSEMBLY WITH PLASTIC BEARING SEALS

BACKGROUND OF THE INVENTION

This invention relates to wheel and bearing assemblies for conveyors and other applications and, more particularly, to wheel and bearing assemblies including wheels or bearing members formed from thermoplastic material and including bearing seals formed from thermoplastic material fused to the plastic wheel or bearing member.

Sealed wheel and bearing assemblies for conveyor and other applications utilizing various types of bearing seals are well known. A common use for many sealed wheel structures is in conveyor applications such as in trolley conveyors for the food handling industry. Such conveyor wheels are subjected to many different environmental conditions such as water sprays for cleaning, extremes of temperature in various food processing operations, and the like. Many prior known sealed wheel structures have been unable to provide complete and effective protection for the internal bearing areas in such environmental conditions. For instance, prior sealed wheels would often admit water therewithin under high pressure water spray conditions which would dilute the bearing lubrication causing wear and corrosion of the bearing surfaces and generally shorten the useful life of the structure.

Another common problem with prior known sealed wheel structures is that of separation of the seals from the wheel during operation. In those wheel structures where the seal attachment was relatively insecure, use of the structures in high speed operation would often cause the seals to loosen or completely separate from the wheels.

Further, many of the prior known sealed wheel and bearing structures utilizing either metal or plastic wheels and metal and/or plastic seals were difficult to manufacture. Typically, prior known seals were held on wheel or bearing structures in reverse taper, inwardly diverging grooves which required the seals fitted therein to have either precise tolerance dimensions or spring-like resiliency for flexing and insertion in the grooves.

Certain attempts were made at using plastic seals held in such grooves. However, because plastic is extremely difficult to hold to precise tolerance dimensions during molding or other forming operations, such seals were not highly effective. Spring-like seals tended to place additional drag on the opposing surface being sealingly engaged. This caused greater wear and a shorter life for the structure. In the case of manufacturing reverse taper grooves in metal wheels or bearings, such seal holding grooves were difficult, time consuming and expensive to machine. In plastic wheels, such reverse tapered, seal holding grooves were difficult to mold.

It was also detrimental to weld metal seals in place because welding heated the races of the metal wheels or bearing causing annealing and softening which decreased the useful life of the structure.

A need arose, therefore, for sealed wheel or bearing structures which could completely and effectively seal out moisture, dirt and other foreign particles or contaminants in various environmental conditions and yet would be wear resistant, have a long life, would hold together and not separate even under high-speed operational conditions, and would be simple and inexpensive to manufacture. The present invention was designed to overcome the above problems and to fill the indicated need.

SUMMARY OF THE INVENTION

Accordingly, the present invention provides a sealed wheel or bearing assembly including thermoplastic seals permanently fused to a thermoplastic wheel or bearing member so as to prevent the entry of water or moisture, dirt and other foreign contaminants into the bearing area within the wheel. The wheel bearing assembly eliminates the need for precise tolerance dimensions in the manufacture of the wheel, bearing or seals, and yet provides a highly durable, long-lasting, wear-resistant, reliable sealed structure useful in many different environmental conditions.

The wheel bearing assembly includes a wheel formed from a thermoplastic material with a circular, outer circumference, opposing sides and an axially extending, central aperture. An outer raceway is provided in the axially extending central aperture for receiving at least one row of antifriction bearings. An inner race having an inner raceway radially spaced from and axially aligned with the outer raceway is provided along with a plurality of antifriction bearings disposed in at least one row between the raceways. An annular seal is included formed from a resilient, thermoplastic material having an outer edge with a maximum radial dimension smaller than the circumference of the wheel and an annular inner edge defining an aperture through the seal. The seal is assembled over the inner race such that it centers itself on an annular surface of the inner race with the seal aperture being coaxial with the inner race. An outer portion of the seal, spaced from the annular inner edge, is fused to the thermoplastic wheel after such assembly.

In another aspect, a wheel bearing assembly is provided including a wheel formed from a thermoplastic material and including an outer raceway in an axially extending central aperture, an inner race having an inner raceway spaced from and axially aligned with the outer raceway and a plurality of antifriction bearings therebetween. A sealing disc formed from a thermoplastic material with a maximum radial dimension smaller than the circumference of the wheel has its outer periphery fused to the wheel such that it covers the end surface of the inner race and the entirety of the opening of the axially extending central aperture of the wheel on one side of the wheel.

When both the annular seal and the sealing disc are used together on the same wheel bearing assembly, the entry of moisture, dirt and other foreign contaminants is effectively prevented from either side of the wheel into the bearing area within the wheel. In the preferred embodiment, the fusing of the thermoplastic seals is accomplished by ultrasonic welding although the use of an adhesive with a solvent base forming a solvent for the thermoplastic materials of the wheel or bearing member and seals could also be used.

The present wheel structure has numerous advantages over prior known sealed wheel and bearing assemblies. The seals fused to either side of the wheel assembly provide a hermetic seal especially useful in conditions where the wheel assembly is sprayed with water. The seals are merged and fused integrally with the wheel and will not separate from the wheel in operation. The annular seal automatically centers itself upon assembly prior to fusion with the thermoplastic wheel by either ultrasonic welding or solvent adhesives thereby eliminating any possible eccentric alignment of the seal aperture with the axis of wheel rotation and the inner race. Further, the thermoplastic seals and sealing discs need not be precisely dimensioned nor is there any need for expensive and time-consuming machining operations to provide structure for holding the seals to the wheel. The wheel assembly is quickly and easily manufactured with the thermoplastic seals permanently fused in place to the thermoplastic wheel. The fusion of the thermoplastic parts does not damage or permanently soften the bearing raceways of the assembly.

These and other objects, advantages, purposes and features of the invention will become more apparent from a study of the following description taken in conjunction with the drawings.

DESCRIPTION OF THE PREFERRED EMBODIMENTS

Figure 1:
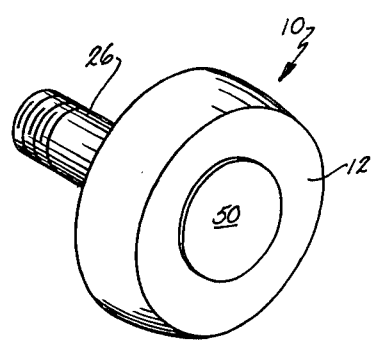
FIG. 1 is a front perspective view of one embodiment of a sealed wheel assembly of the present invention.

Referring now to the drawings in greater detail, FIGS. 1-4 illustrate a first embodiment 10 of the sealed wheel or bearing assembly. Wheel assembly 10 is designed as a trolley wheel especially useful in the food handling industry because of its corrosion resistance due to manufacture from plastic and stainless steel components. Wheel assembly 10 includes a wheel or bearing member 12 formed from a thermoplastic material such as Delrin acetal resin manufactured by the I. E. DuPont de Nemours & Company, Wilmington, Delaware, or equivalent, which includes a circular outer circumference and opposing axial end or side surfaces 14, 16. In the form shown in solid in FIG. 4, the outer circumference decreases in diameter from side surface 16 to side surface 14 so as to accommodate the sloped surface of an "I" beam overhead conveyor support or the like. Alternately, wheel or bearing member 12 may include a constant diameter outer circumference except for an integral flange (shown in phantom in FIG. 4). The flange form is useful in supporting conveyor rolls or the like as in roller conveyors.

A central, axially extending aperture 18 is formed through the center of wheel 12 and includes a pair of metallic outer race rings 20, 22 which are contoured to the shape of ball bearings and fitted within the wheel in a back-to-back fashion. The wheel 12 is preferably molded about rings 20, 22 and extends radially inwardly over the end surfaces of the rings to retain them in axial position. The end surfaces of the rings may include recesses or indentations filled by the thermoplastic material of the wheel to prevent the rings from rotating.

Figure 2:
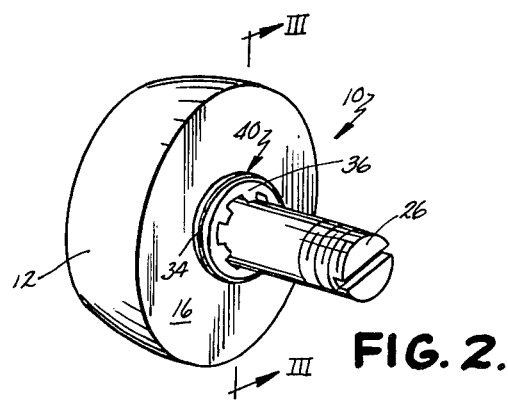
FIG. 2 is a rear perspective view of the sealed wheel assembly of FIG. 1.

Spaced radially inwardly from the rings 20, 22 is an inner race assembly 24 including a shaft 26 threaded on one end for attachment to a suspended bracket or the like for use on overhead conveyor installations and an integral, enlarged head 28 at the other end. The inner raceways of the wheel assembly are provided by a pair of abutting, metallic, inner race rings 30, 32 which include contoured, outer circumferences matched to the contour of ball bearings 25. Inner race ring 32, which is farthest from head 28 of inner shaft 26, includes an annular outer surface which extends axially outwardly of the inner raceway receiving the ball bearings 25 thereon and extends beyond the side surface 16 of the wheel 12 when the wheel assembly is complete. In certain applications, wheel 12 could have an overall width which is as wide as the combined inner race members 30, 32. Inner race rings 30, 32 are held together and against the head 28 of shaft 26 by a spring clip retainer 36 (FIGS. 2, 3 and 4).

The basic wheel structure described above is disclosed in copending U.S. patent application Ser. No. 684,552, filed May 10, 1976, entitled "TROLLEY WHEEL AND METHOD FOR MAKING SAME", invented by Douglas J. VanDerMeulen and Siegfried K. Weis, assigned to the same assignee as the present invention, the disclosure of which is hereby incorporated by reference herein.

Figure 3:
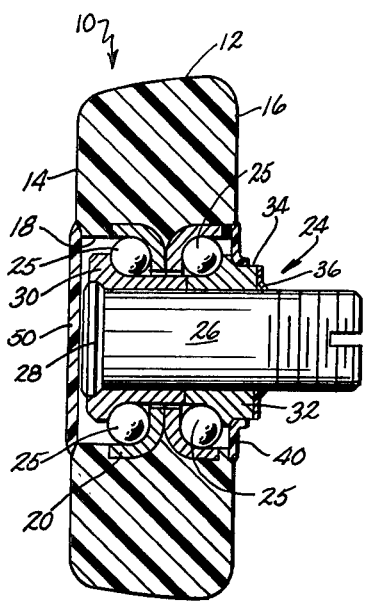
FIG. 3 is a sectional elevation of the sealed wheel assembly taken along plane III—III of FIG. 2.
Figure 4:
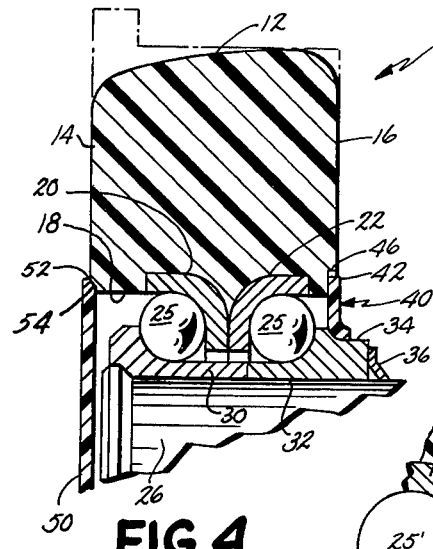
FIG. 4 is a fragmentary, enlarged sectional elevation of the wheel assembly of FIGS. 1-3 with the thermoplastic seal and sealing disc in place but prior to fusion thereof to the thermoplastic wheel.

As shown in FIGS. 3 and 4, the wheel assembly 10 includes an annular, inner seal 40 which is fused to side 16 of wheel 12 and sealingly engages annular, inner race surface 34. Seal 40 is a thin, generally planar, annular, ring-like member preferably formed by molding from a thermoplastic material which is sufficiently resilient and flexible to provide efficient sealing qualities and yet is sufficiently wear resistant to provide a long life for the assembly. A preferred material is Delrin acetal resin which is also the preferred material for wheel 12. Such material is capable of being fused by ultrasonically welding or bonding with a solvent adhesive to provide a tough, permanent union. Seal 40 includes a circular outer edge 42 having a maximum diameter smaller than the minimum circumferential diameter of wheel 12 and a circular inner edge 44 defining a central aperture through the seal which allows the seal to be fitted over inner race ring 32 on annular inner race surface 34.

As shown in FIG. 4, which illustrates assembly 10 prior to fusion of seal 40 to wheel 12 by ultrasonic welding or a solvent adhesive, a slight recess 46 is provided in the side surface 16 of wheel 12 adjacent central aperture 18. Recess 46 opens axially outwardly and radially inwardly for receipt of at least a part of the outer portion of seal 40. Recess 46 is circular when viewed perpendicularly to side surface 16 and has a diameter slightly larger than the maximum diameter of outer edge 42 of seal 40. The inner edge 44 of seal 40 has a diameter slightly smaller than the diameter of surface 34 of inner race ring 32 such that when seal 40 is telescoped over surface 34, the resilient seal material allows the edge 44 to flex outwardly to form an annular flange which contours itself to the shape of surface 34 and extends axially outwardly as shown in FIGS. 3 and 4. The flexed shape of the assembled seal places a greater amount of the seal in engagement with the inner race. In addition, the larger size of recess 46 allows the seal 40 to seat and center itself without restriction. Edge 44 of the seal seats properly all around the surface 34 and the aperture in the seal is concentric to the axis of the inner race assembly 24. After such self-centering assembly or insertion over the inner race, seal 40 is fused by ultrasonic welding or a solvent adhesive to the wheel 12 within recess 46 such that the thermoplastic materials of the seal and wheel are completely merged and unified to form a permanent bond or weld as shown in FIG. 3.

On the opposite side 14 of wheel 12 from side 16, the inner race assembly 24 terminates at head 28 at a plane spaced axially inwardly of the outer side surface 14 of the wheel. A sealing disc 50 is fitted over the entire central aperture 18 such that it covers that aperture and the end of the inner race as well as the bearing area of the wheel assembly 10. Sealing disc 50 is a thin, generally planar, solid disc preferably molded from thermoplastic material which may be fused or welded to the wheel 12 in the manner of seal 40. Seal 50 includes a circular outer edge 52, the inner portion of which may be beveled to fit a bevel or recess 54 between the central aperture 18 and side surface 14 of wheel 12. After the bearings are assembled within the wheel assembly and either before or after seal 40 is fused in place, solid sealing disc 50 may be laid into recess 54 and ultrasonically welded or adhered by a solvent adhesive in place to permanently attach the same to the wheel. When both sealing disc 50 and seal 40 are in place, the bearing area within the wheel is completely and effectively hermetically sealed to prevent the entrance of moisture, water, dirt or other foreign contaminants therewithin. The resiliency of seal 40 continuously urges edge 44 against surface 34 to accommodate and wear on the seal.

Figure 5:
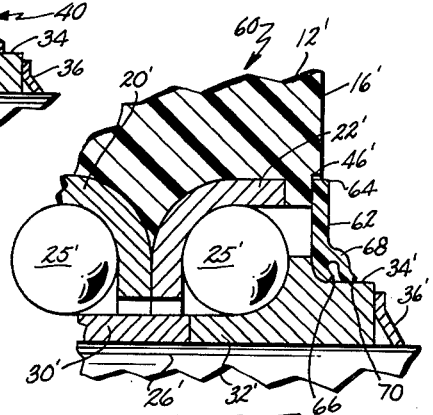
FIG. 5 is a fragmentary, enlarged sectional view of a modified embodiment of the sealed wheel structure including a double lip seal prior to fusion to the thermoplastic wheel.
Figure 6:
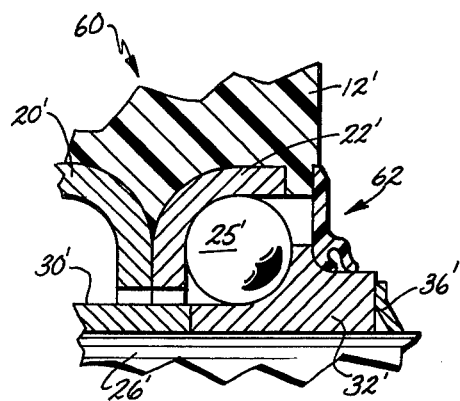
FIG. 6 is a fragmentary, sectional elevation of the wheel shown in FIG. 5 following fusion of the seal to the thermoplastic wheel.

FIGS. 5 and 6 illustrate a modified wheel assembly 60 which is substantially identical to that shown in FIGS. 1-4 except for seal 62. Common elements are denoted by prime numerals. Assembly 60 differs from assembly 10 by the inclusion of a double lip, annular plastic seal 62. Seal 62 is a thin, annular, ring-like member molded from thermoplastic material, preferably Delrin nylon as is seal 40. Seal 62 includes a circular outer circumferential edge 64, a first circular inner edge 66 defining a first aperture through the seal, and a second annular sealing flange 68 ending in a circular inner edge 70 defining a second aperture through the seal. Flange 68 is coterminous with edge 66 and generally parallel to and spaced axially from the first flange. The diameters of the apertures defined by edges 66 and 70 are slightly smaller than the diameter of the annular surface 34' so as to cause edges 66, 70 to flare outwardly in the manner described for edge 44 of seal 40 when the seal 62 is telescoped or assembled over surface 34'. Seal 62 is at least partially received in recess 46' prior to fusion with the thermoplastic wheel 12' after aligning itself concentrically with surface 34' as described in connection with wheel assembly 10. Wheel 60 is shown after fusion by ultrasonic welding or with a solvent adhesive in FIG. 6. The double sealing flanges provide a double barrier to entry of moisture, dirt and other foreign contaminants into the bearing area.

Figure 7:
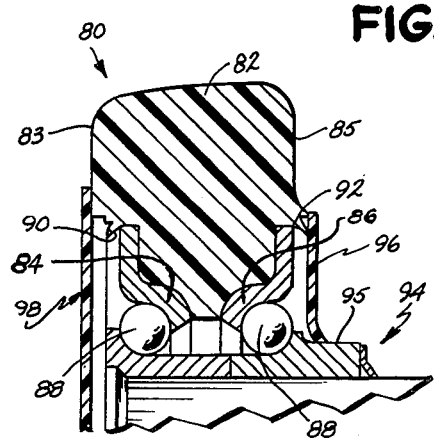
FIG. 7 is a fragmentary, sectional view of a third embodiment of the sealed wheel assembly wherein the seal and sealing disc are applied against the axially outermost side surfaces of the wheel and shown prior to fusion to the thermoplastic wheel.
Figure 8:
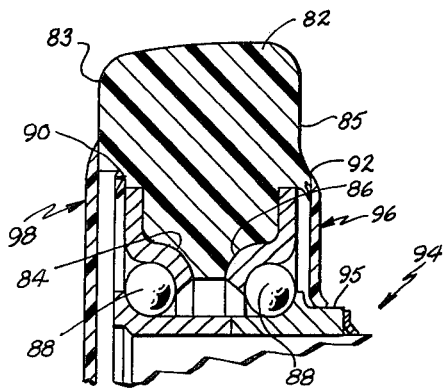
FIG. 8 is a fragmentary, sectional elevation of the assembly of FIG. 7 but illustrating the seal and sealing disc after fusion to the thermoplastic wheel.

As shown in FIGS. 7 and 8, a third embodiment of the sealed wheel assembly 80 is shown including a slightly modified wheel structure which is disclosed in U.S. patent application Ser. No. 684,627, filed May 10, 1976, entitled "TROLLEY WHEEL" invented by Charles C. Frost, Douglas J. VanDerMeulen and Walter M. Rosin, now U.S. Pat. No. 4,019,789, assigned to the same assignee as the present invention, the disclosure of which is hereby incorporated by reference herein. Wheel assembly 80 includes a thermoplastic wheel 82 similar to wheels 12 and 12' described above. Wheel 82 includes contoured recesses on either side receiving metallic outer race rings 84, 86. Rings 84, 86 include radially outwardly extending flanges and contoured portions each of which receive a row of ball bearings 88. The sides of wheel 82 are staked over the circumferential edge of the radial flanges of outer race rings 84, 86 at 90, 92, respectively, to hold the rings in axial position. The outer edges of the radial flanges may be shaped to mate with the wheel 82 to prevent rotation thereof as is described in application Ser. No. 684,627 mentioned above now U.S. Pat. No. 4,019,789. The metallic inner race assembly 94 is similar to inner race assembly 24 described above in connection with wheel assembly 10.

Wheel assembly 80, in addition to the wheel structure differences mentioned above, also differs from assemblies 10 and 60 by the fusion of thermoplastic seals 96, 100 to the axially outermost surfaces at sides 83, 85 of wheel 82. As shown in FIGS. 7 and 8, inner seal 96 is similar to seals 40, 62 except that it has a larger radial dimension between its outer and inner edges. Seal 96 abuts the axially outermost surface of wheel side 85 and sealingly engages annular inner race surface 95 to seal the inner side of the wheel assembly. After fusion by ultrasonic welding or bonding by a solvent adhesive, the thermoplastic seal 96 is merged and fused to the side of the wheel as shown in FIG. 8.

On the opposite side 83 of wheel 82, a solid sealing disc 98, similar to sealing disc 50, abuts side 83 of the wheel and is fused or merged with the wheel side as shown in FIG. 8. Use of seal 96 and sealing disc 98 retains the advantages of the present invention but eliminates the need to form recesses in sides 83, 85 of wheel 82 before assembly and fusion.

Figure 9:
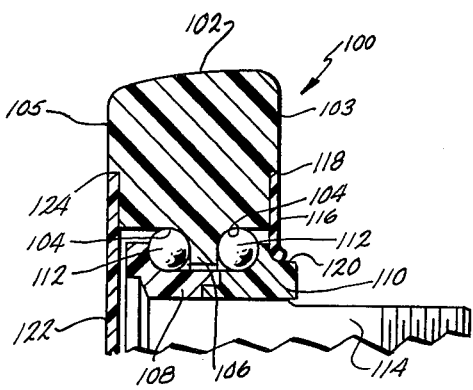
FIG. 9 is a fragmentary, sectional elevation of a fourth embodiment of the sealed wheel assembly of the present invention wherein the outer and inner bearing members as well as the seal and sealing disc are all made from thermoplastic materials.

As shown in FIG. 9, a fourth embodiment 100 of the wheel or bearing assembly is shown including inner and outer bearing members both of which are formed from thermoplastic material such as Delrin acetal resin. Assembly 100 includes a wheel or outer bearing member 102 similar to wheels 12 and 12' having contoured outer bearing raceways 104 formed in the central aperture therethrough. An annular wall 106 integral with the wheel separates the two outer raceways. A pair of inner race members 108, 110 abut one another and include contoured, outer circumferences in radial alignment with outer raceways 104. Two rows of metallic ball bearings 112 are received between outer raceways 104 and the contoured outer surfaces of the inner race members. A headed stud or axle 114 is press fitted through the internal, aligned bores of the inner race members. An annular, inner thermoplastic bearing seal 116, similar to seals 40 and 96, is received in recess 118 on side surface 103 of wheel 102 and sealingly engages and is centered on and concentric with an annular contoured surface 120 of inner race member 110 to provide a hermetic seal on that side of the assembly. On the opposite side of the assembly, a sealing disc 122 is received in a recess 124 on side 105 of wheel 102 in a manner similar to that shown for sealing disc 50 in FIGS. 3 and 4. Seal 116 and sealing disc 122 are fused in place by ultrasonic welding or a solvent adhesive as is described in the other embodiments above.

Figure 10:
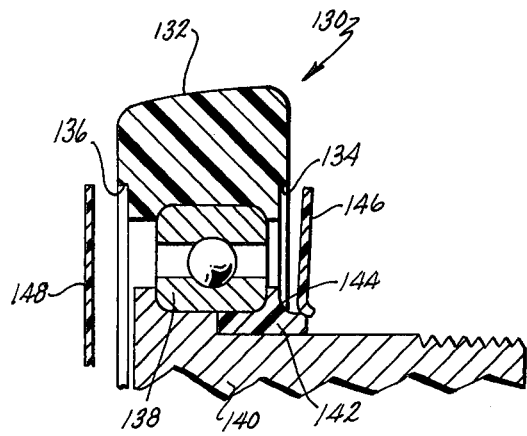
FIG. 10 is a fragmentary, sectional, exploded elevation of a fifth embodiment of the sealed assembly including a single row bearing unit and shown prior to fusion of the seal and sealing disc to the outer bearing member.
Figure 11:
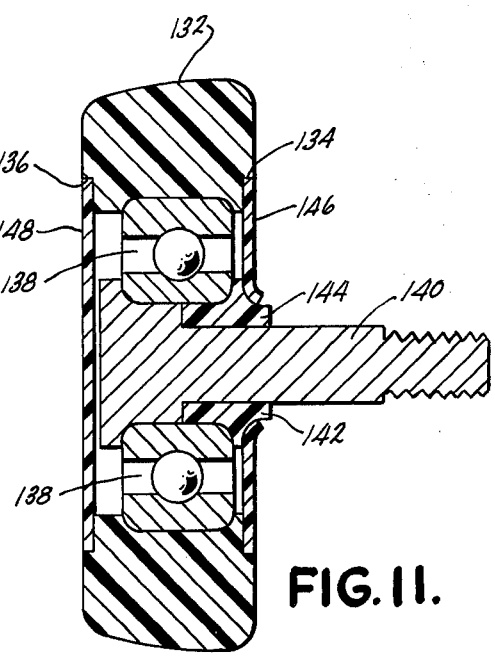
FIG. 11 is a sectional elevation of the sealed assembly shown in FIG. 10 after fusion of the seals to the thermoplastic wheel or bearing member.

FIGS. 10 and 11 illustrate yet another embodiment 130 of the present invention including a thermoplastic outer wheel or bearing member 132 having side recesses 134, 136 on opposite sides. A single row bearing unit 138 is received on the inner bore of wheel 132 to provide rotational movement about a pair of hub members 140, 142 which support the inner race of the bearing unit. Hub member 140 is shouldered to receive ring-like member 142 in abutment therewith. Member 142 includes an annular, outer circumferential surface 144 in general axial alignment with recess 134 in wheel 132 for receipt of a thermoplastic seal 146 which is telescoped over surface 144 to align and center itself coaxially with member 142 before receipt and fusion in recess 134. On the opposite side of the assembly, a generally planar, thermoplastic sealing disc 148 is received and fused within recess 136 to cover the opposite side of the assembly in the manner described above for the other embodiments. Like the other embodiments, seals 146 and sealing disc 148 are fused by ultrasonic welding or a solvent adhesive in their respective recesses after assembly.

Fusion attachment of the thermoplastic seals 40, 62, 96, 116 and 146, as well as the sealing discs 50, 98, 122 and 148 to the thermoplastic wheels or bearing members is best accomplished with conventional ultrasonic sealing apparatus (not shown) which may include a cylindrical ultrasonic sealing member which is engaged with the outer circumferential portion of the seals described herein to heat the same by ultrasonic vibration so that the plastic of the wheel and seals is completely merged and fused together. Such fusion does not heat or cause any softening or degradation of the raceway areas of the wheels or bearing members.

As an alternate to ultrasonic sealing of the seals to the wheels and bearing members, a solvent adhesive, which is based on a solvent for the thermoplastic materials used in the wheels and seals, may be utilized. The thermoplastic materials are effectively fused together as with ultrasonic sealing by the use of such a solvent adhesive since the thermoplastic materials are melted, merged and dissolved together by the adhesive solvent. One solvent adhesive which would be useful in the present application is that sold under the Product No. 3M-EC711 by the 3M Corporation of St. Paul, Minnesota. The materials utilized for the seals and wheels must be sufficiently compatible to enable fusion by either ultrasonic sealing or solvent adhesives. The above-described Delrin acetal resin, preferably used for both the wheels and seals, meets these requirements. In addition, Delrin is wear resistant and sufficiently flexible and resilient to provide effective sealing qualities over the entire life of the wheel assembly.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A wheel bearing assembly comprising a wheel formed from a thermoplastic material and having an outer circumference, opposing sides and an axially extending, central aperture therethrough; an outer raceway in said axially extending central aperture for receiving at least one row of antifriction bearings; an inner race having an inner raceway radially spaced from and axially aligned with said outer raceway for receiving at least one row of antifriction bearings; a plurality of antifriction bearings disposed in at least one row in said raceways; said inner race having an annular surface axially outward of said inner raceway on at least one side of said inner raceway; and an annular seal formed from a resilient, thermoplastic material and having an outer edge with a maximum radial dimension smaller than the circumference of said wheel and an annular inner edge defining an aperture through said seal; said seal being assembled over said inner race such that said seal centers itself, an inner portion of said seal sealingly engaging said annular surface of said inner race, said seal aperture being coaxial and concentric with said inner race, an outer portion of said seal spaced from said annular inner edge being fused to said thermoplastic wheel after such assembly whereby moisture, dirt and other contaminants are prevented from entering said bearing area including said raceways and bearings.

2. The wheel assembly of claim 1 wherein said thermoplastic seal is fused to the axially outermost side surface of said thermoplastic wheel.

3. The wheel assembly of claim 2 wherein said thermoplastic seal is ultransonically welded to said axially outermost side surface.

4. The wheel assembly of claim 1 wherein the side of said wheel on the same side as said annular inner race surface includes a recess opening axially outwardly and radially toward said inner race; the radial dimension of said recess being slightly larger than that of said seal to allow the seal to center itself on said inner race surface and at least partially within said recess; said seal being fused to said wheel in said recess.

5. The wheel assembly of claim 4 wherein said thermoplastic seal is ultrasonically welded to said wheel within said recess.

6. The wheel assembly of claim 5 wherein said seal is a double lip seal including a second sealing flange extending from said seal and engaging said annular inner race surface, said second sealing flange being generally parallel to but spaced axially from the annular inner edge of said seal and coterminous with said inner edge of said seal thereby forming a double barrier to contamination of said bearing area.

7. The wheel assembly of claim 1 wherein said seal is a double lip seal including a second sealing flange extending from said seal and engaging said annular inner race surface, said second sealing flange being generally parallel to but spaced axially from the annular inner edge of said seal and coterminous with said inner edge of said seal thereby forming a double barrier to contamination of said bearing area.

8. The wheel assembly of claim 1 wherein said seal is ultrasonically welded to said wheel.

9. The wheel assembly of claim 1 wherein said seal is fused to said wheel with an adhesive having a solvent base which is a solvent for said thermoplastic materials of said wheel and seal such that said seal and wheel are melted and bonded together.

10. The wheel assembly of claim 1 wherein said annular seal is generally planar, the diameter of said aperture in said seal being slightly smaller than that of said annular inner race surface whereby said inner edge of said seal is deflected axially outwardly upon assembly with said inner race to provide a wider sealing area between said seal and inner race.

11. The wheel assembly of claim 1 wherein said inner race terminates adjacent the side of said wheel opposite said one side of said inner raceway; a sealing disc formed from a thermoplastic material and having its outer periphery fused to said wheel such that it covers and seals the entirety of the opening of said axially extending central aperture of said wheel on said opposite side.

12. The wheel assembly of claim 11 wherein said opposite side of said wheel includes a recess adjacent said central aperture opening axially outwardly and radially inwardly; said sealing disc located at least partially within said recess and fused to said wheel within said recess.

13. The wheel assembly of claim 11 wherein said sealing disc is ultrasonically welded to said wheel.

14. The wheel assembly of claim 11 wherein said sealing disc is fused to said wheel with an adhesive having a solvent base which is a solvent for said thermoplastic materials of said wheel and sealing disc such that said sealing disc and wheel are melted and bonded together.

15. The wheel assembly of claim 11 wherein said sealing disc, annular seal and wheel are formed from acetal resin.

16. A wheel bearing assembly comprising a wheel formed from a thermoplastic material and having an outer circular circumference, opposing sides and an axially extending, central aperture therethrough; an outer raceway in said axially extending, central aperture for receiving at least one row of antifriction bearings; an inner race having an inner raceway spaced from and axially aligned with said outer raceway for receiving at least one row of antifriction bearings; a plurality of antifriction bearings disposed in at least one row in said raceways; said inner race terminating at an end surface; and a sealing disc formed from a thermoplastic material with a maximum radial dimension smaller than the circumference of said wheel and having its outer periphery fused to said wheel such that it covers said end surface of said inner race and the entirety of the opening of said axially extending central aperture of said wheel on one side of said wheel to prevent contamination of said bearings with moisture, dirt or other foreign materials.

17. The wheel assembly of claim 16 wherein said one side of said wheel includes a recess opening axially outwardly and radially inwardly; said sealing disc being at least partially received and fused to said wheel in said recess.

18. The wheel assembly of claim 16 wherein said sealing disc is fused to the axially outermost surface of said one side of said wheel.

19. The wheel assembly of claim 16 wherein said sealing disc is ultrasonically welded to said wheel.

20. The wheel assembly of claim 16 wherein said sealing disc is fused to said wheel with an adhesive having a solvent base which is a solvent for said thermoplastic materials of said wheel and sealing disc such that said sealing disc and wheel are melted and bonded together.

21. The wheel assembly of claim 16 wherein said inner race has an annular surface axially outward of said inner raceway on the side of said inner raceway opposite to said sealing disc; an annular seal formed from a resilient, thermoplastic material and having an outer edge with a maximum radial dimension smaller than that of the circumference of said wheel and an annular inner edge defining an aperture through said seal; said seal being assembled over said inner race such that said seal centers itself with an inner portion of said seal sealingly engaging said annular surface of said inner race, said seal aperture being coaxial and concentric with said inner race, an outer portion of said seal spaced from said annular inner edge being fused to said thermoplastic wheel after such assembly.

22. The wheel assembly of claim 21 wherein said annular seal is generally planar, the diameter of said aperture in said seal being slightly smaller than that of said annular inner race surface whereby said inner edge of said seal is deflected axially outwardly upon assembly with said inner race to provide a wider sealing area between said seal and inner race.

23. The wheel assembly of claim 22 wherein said sealing disc, annular seal and wheel are formed from acetal resin.

24. The wheel assembly of claim 21 wherein said seal is a double lip seal including a second sealing flange extending from said seal and engaging said annular inner race surface, said second sealing flange being generally parallel to but spaced axially from the annular inner edge of said seal and coterminous with said inner edge of said seal thereby forming a double barrier to contamination of said bearing area.

* * * * *